United States Patent
Yang et al.

(10) Patent No.: US 6,452,901 B1
(45) Date of Patent: *Sep. 17, 2002

(54) CELL LOSS BALANCE SYSTEM AND METHOD FOR DIGITAL NETWORK

(75) Inventors: Tao Yang, Belleville (CA); Chikong Shue, Andover; Mohamed Abdelaziz, Lowell, both of MA (US)

(73) Assignee: Cascade Communications Corporation, Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,389

(22) Filed: Feb. 8, 2000

Related U.S. Application Data (63) Continuation of application No. 08/768,110, filed on Dec. 16, 1996, now Pat. No. 6,097,698.

(51) Int. Cl.[7] .......................... H04L 12/26; H04L 12/56
(52) U.S. Cl. ..................... 370/231; 370/235; 370/395.1; 370/412; 709/232
(58) Field of Search ............................. 370/230, 231, 370/232, 233, 234, 235, 236, 252, 253, 389, 395.1, 398, 399, 409, 412, 415, 416, 419, 422, 428, 429; 709/213, 232, 233, 234, 235, 249, 250

(56) References Cited

U.S. PATENT DOCUMENTS

| | | | |
|---|---|---|---|
| 5,140,584 A | | 8/1992 | Suzuki ........................ 370/60 |
| 5,179,556 A | | 1/1993 | Turner ........................ 370/94.1 |
| 5,282,203 A | | 1/1994 | Couchi ........................ 370/94.1 |
| 5,335,222 A | | 8/1994 | Kamoi et al. ................. 370/60 |
| 5,394,396 A | | 2/1995 | Yoshumira et al. ............ 370/60 |
| 5,696,764 A | * | 12/1997 | Soumiya et al. ............. 370/395 |
| 5,726,987 A | | 3/1998 | Uriu et al. ................... 370/395 |
| 5,793,747 A | * | 8/1998 | Kline ......................... 370/230 |

OTHER PUBLICATIONS

* T. Yang and J. Pan, "A Measurement–based cell loss scheduling scheme," *Proc. IEEE Infocom '96* pp. 1062–1071, San Francisco, CA U.S.A., Mar. 1996.

* cited by examiner

*Primary Examiner*—Alpus H. Hsu
(74) *Attorney, Agent, or Firm*—Weingarten, Schurgin, Gagnebin & Hayes (57) ABSTRACT

A switching node for use in connection with a computer network includes an input interface, a buffer and a control element. The input interface receives cells from at least one input communication link. The buffer buffers selected cells prior to transmission over at least one output communication link. The control element selectively enables cells received by said input interface to be buffered in said buffer. The control element discards cells if the cell occupancy of the buffer exceeds a predetermined threshold level and a credits value indicates that the switching node has loaded a number of cells into the buffer for transmission which exceeds a cell loss ratio guarantee provided by the switching node.

15 Claims, 8 Drawing Sheets

CELL LOSS BALANCE SYSTEM AND METHOD FOR DIGITAL NETWORK

This application is a continuation of prior application Ser. No. 08/768,110, filed Dec. 16, 1996, entitled: CELL LOSS BALANCE SYSTEM AND METHOD FOR DIGITAL NETWORK, which issued as U.S. Pat. No. 6,097,698 on Aug. 1, 2000.

FIELD OF THE INVENTION

The invention relates generally to the field of digital communications systems and more particularly to digital networks for facilitating communication of digital data in, for example, digital image, audio and video distribution systems and among digital computer systems

BACKGROUND OF THE INVENTION

Digital networks have been developed to facilitate the transfer of information, including data and programs, among digital computer systems and other digital devices. A variety of types of networks have been developed and implemented using diverse information transfer methodologies. In some networks, such as the well-known Ethernet, a single wire is used to interconnect all of the devices connected to the network. While this simplifies wiring of the network in a facility and connection of the devices to the network, it results in generally slow information transfer, since the wire can only carry information, in the form of messages, from a single device at a time. To alleviate this to some extent, in some Ethernet installations, the network is divided into a number of sub networks, each having a separate wire, with interfaces interconnecting the wires. In such installations, wires can carry messages for devices connected thereto simultaneously, which increases the number of messages that can be transferred simultaneously. It is only when a device connected to one wire needs to send a message to a device connected to another wire that wires in two or more sub-networks will be used, making them unavailable for use by other devices connected thereto.

To alleviate this, networks have been developed in which communications are handled through a mesh of switching nodes. The computer systems and other devices are connected to various ones of the switching nodes. Since the switching nodes themselves are interconnected in a variety of patterns, a number of paths may be available between pairs of the devices, so that if one path is congested, another may be used. Such an arrangement may result in a network which is more complicated than an Ethernet network, but it can provide substantially higher information transfer rates, particularly if optical fiber is used as the media interconnecting the switching nodes and devices. A problem which may arise with such networks is that, in such networks, a switching node or a device, when it is receiving information from another switching node or device in the network, does not have a mechanism to provide "flow-control" information to the transmitting switching node or device. While this does reduce the cost of a network, it may result in congestion, in which a switching node may receive information at a rate faster than it can transmit it.

This problem has been addressed in one type of network, namely, a network implemented in accordance with the ATM ("Asynchronous Transfer Mode") methodology. In such a network, a "packet" of data is transmitted from a source device to one or more destination devices in a series of "cells." If a switching node detects congestion, such that it is receiving cells faster than it can transmit them, it can make use of several mechanisms. In one such mechanism, identified as "early packet discard," which may be used if a moderate amount of congestion is experienced, the switching node first refuses to accept cells related to any new packets, but it attempts to continue transferring cells associated with packets it has already begin transferring. This may alleviate the congestion downstream of the switching node, or at least provide that it does not increase. However, the congestion may continue increasing to a point where the node activates a second mechanism, identified as "partial packet discard." In the partial packet discard mechanism, if the switching node, due to increased congestion, has to drop one cell for a packet that it has begun transferring, it will continue dropping the cells from the same packet because all of the cells for a packet are required to correctly reassemble the packet at the destination. If the partial packet discard mechanism is activated due to congestion, partial packet discard should reduce it, but the packets which have been discarded may be re-transmitted by the source, so the switching nodes's resources used to transfer the cells prior to activation of the partial packet discard mechanism were wasted.

A problem arises, however, in connection with the cell or packet discard mechanisms used in ATM networks. In particular, the ATM transfer methodology defines a number of types of service classes, and, for several of those service classes, service rate and cell loss guarantees may be provided. For connections which have a particular service rate guarantee, each switching node handling cells for a particular user will guarantee that cells associated with those connections will be transferred at least at a particular minimum rate through the network. This service rate may differ as among the various network users. Users may be provided with a minimum service rate, in which case they expect to be provided with at least a specified minimum rate, but may be transferred at a faster rate when there is available transfer bandwidth above the bandwidth that required for the connections for which there is a service rate guarantee. In addition, if cell loss guarantees are provided, the switching nodes handling cells for a particular user will guarantee that they will only lose, discard or otherwise fail to transfer cells for the user at a particular cell loss rate. The problem arises in that care must be taken to identify users for which cells can be discarded, to ensure that their guarantees are observed.

SUMMARY OF THE INVENTION

The invention provides a new and improved system and method for controlling the cell loss in a digital network to ensure that the cell loss guarantees provided by the network are observed.

In brief summary, the invention provides a switching node for use in connection with a computer network. The switching node includes an input interface, a buffer and a control element. The input interface receives cells from at least one input communication link. The buffer buffers selected cells prior to transmission over at least one output communication link. The control element selectively enables cells received by said input interface to be buffered in said buffer. The control element discards cells if the cell occupancy of the buffer exceeds a predetermined threshold level and a credits value indicates that the switching node has loaded a number of cells into the buffer for transmission which exceeds a cell loss ratio guarantee provided by the switching node. In one embodiment, the switching node provides an individual cell loss ratio guarantee for each virtual circuit being handled by the switching node. In that embodiment, the control element determines a credits value associated with each virtala circuit, the credits value indicating whether the switching node has properly transmitted cells for the virtual circuit at a rate which exceeds the cell loss ratio guarantee. If the credits value indicates that the switching node has transmitted cells for the virtual circuit at such a rate, if the cell occupancy of the buffer exceeds the threshold, a cell associated with the virtual circuit can be discarded and the switching node will still meet its cell loss ratio guarantee. The control element can perform these operations in connection with each of the virtual circuits being handled by the switching node, thereby permitting a balancing of cell loss among the virtual circuits in accordance with their respective cell loss ratio guarantees, when the cell occupancy of the buffer exceeds the predetermined threshold level.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
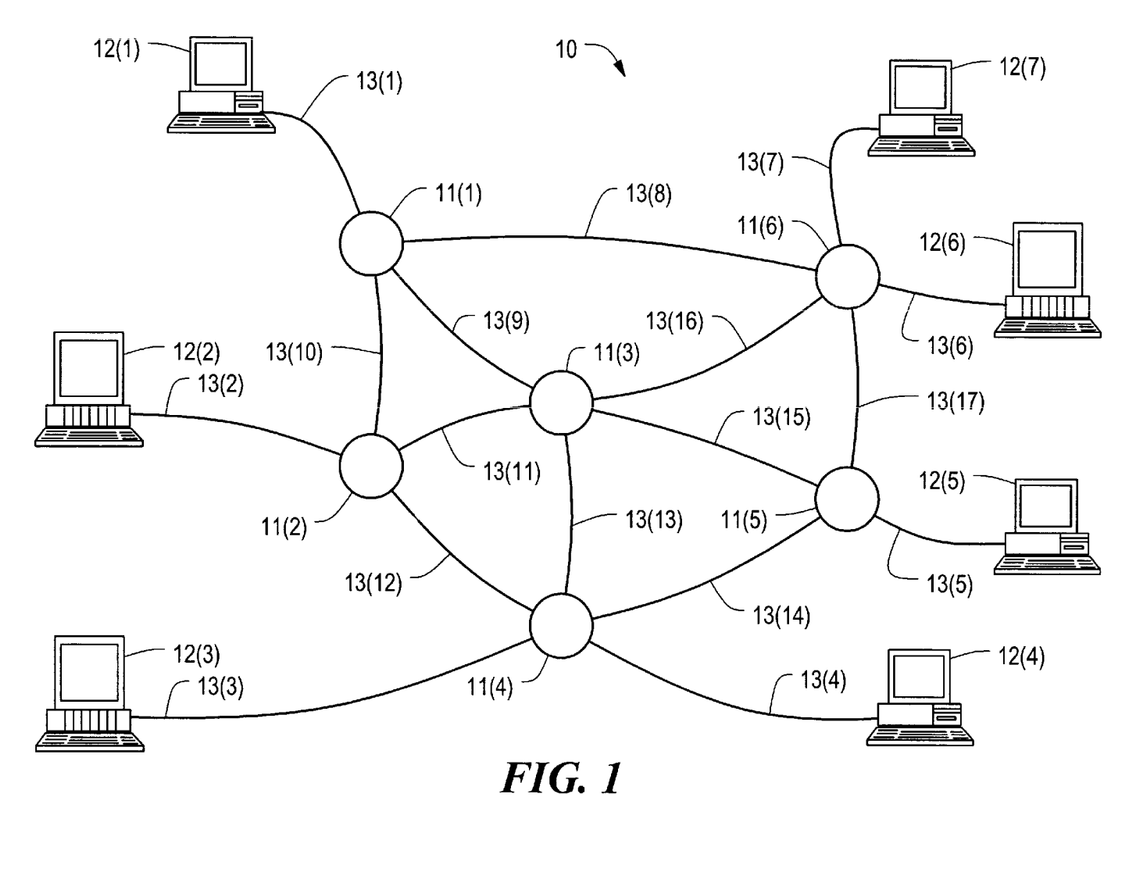
FIG. 1 schematically depicts a computer network including a switching node constructed in accordance with the invention.

FIG. 1 schematically depicts a computer network 10 including a plurality of switching nodes 11(*1*) through 11(N) (generally identified by reference numeral 11(*n*)) for transferring signals representing data among a number of devices, which in FIG. 1 are represented by computer systems 12(*l*) through 12(M) (generally identified by reference numeral 12(*m*)). The computer systems 12(*m*), as is conventional, process data, in accordance with their program instructions to generate processed data. In their processing, a computer system 12($m_S$) (subscript "S" referencing "source") may, as a source computer system, need to transfer data, processed data and/or program instructions (all of which will be referred to herein generally as "information") to another, destination, computer system 12($m_D$) (subscript "D" referencing "destination"), which may need to use the transferred information in its operations. Each computer system 12(*m*) is connected over a communication link, generally identified by reference numeral 13(*p*), to a switching node 11(*n*) to facilitate transmission of data thereto or the reception of data therefrom. The switching nodes 11(*n*) are interconnected by communication links, also generally identified by reference numeral 13(*p*) to facilitate the transfer of data thereamong. The communication links 13(*p*) may utilize any convenient data transmission medium; in one embodiment, the transmission medium of each communication link 13(*p*) is selected to comprise one or more fiber optic links. Each communication link 13(*p*) is preferably bidirectional, allowing the switching nodes 11(*n*) to transmit and receive signals among each other and with computer systems 12(*m*) connected thereto over the same link; in the embodiment in which the communication links 13(*p*) are fiber optic links, two optical fibers will be provided for each communication link 13(*p*), each of which facilitates unidirectional transfer of optical signals.

In one embodiment, the network 10 transfers data using the well-known "ATM" ("Asynchronous Transfer Mode") transfer methodology. That methodology is described in detail in C. Partridge, *Gigabit Networking*, (Reading Mass.: Addison Wesley Publishing Company, 1994), primarily in chapters 3 and 4, and D. McDysan, et al., *ATM Theory And Application* (McGraw Hill, 1995) and will not be described in detail. Generally, with reference to FIG. 2, in the ATM methodology, the computer systems 12(*m*) and the switching nodes 11(*n*) transmit data in the form of fixed-length "cells." In the ATM data transfer methodology, for a packet 20 to be transmitted from a source computer system 12($m_S$) to a destination computer system 12($m_D$), the source computer system 12($m_S$) allocates the data packet 20 to a plurality of "cells," identified CELL(1) through CELL(I) (generally identified "CELL(i)"), for transmission serially over the communication link 13(*p*) to initiate transfer thereof over the network 10. Each cell includes a header portion HEADER(i) and a data portion DATA(i), with the header portion HEADER(i) including "virtual circuit" information for controlling the transfer of the cell over the network 10, and the data portion DATA(i) containing data from the packet 20. The data portion DATA(i) of each cell is of fixed, predetermined length (in one embodiment forty-eight bytes) and so the source computer system 12($m_S$) will pad the data in the last data portion DATA(i) if the amount of data in the packet 20 is not an integral multiple of the size of the data portion DATA(i) of each cell to ensure that the last data portion DATA(i) has the required length.

As noted above, the source computer system 12($m_S$) transmits the series of cells CELL(1) through CELL(i) generated from a data packet 20 in order, and the network 10 is to deliver the cells to the destination computer system 12($m_D$) in the order in which they are transmitted. The destination computer system 12($m_D$) must receive all of the cells transmitted by the source computer system 12($m_S$) in order to reconstruct the packet 20. In the aforementioned ATM transfer methodology, the cells do not contain ordering information; and so the destination computer system 12($m_D$) determines the proper order to reconstitute the packet 20 from the order in which it receives the cells. The last cell CELL(i) includes a set end of packet flag, designated EOP in FIG. 2, to indicate that it is the last cell for the packet.

Figure 2:
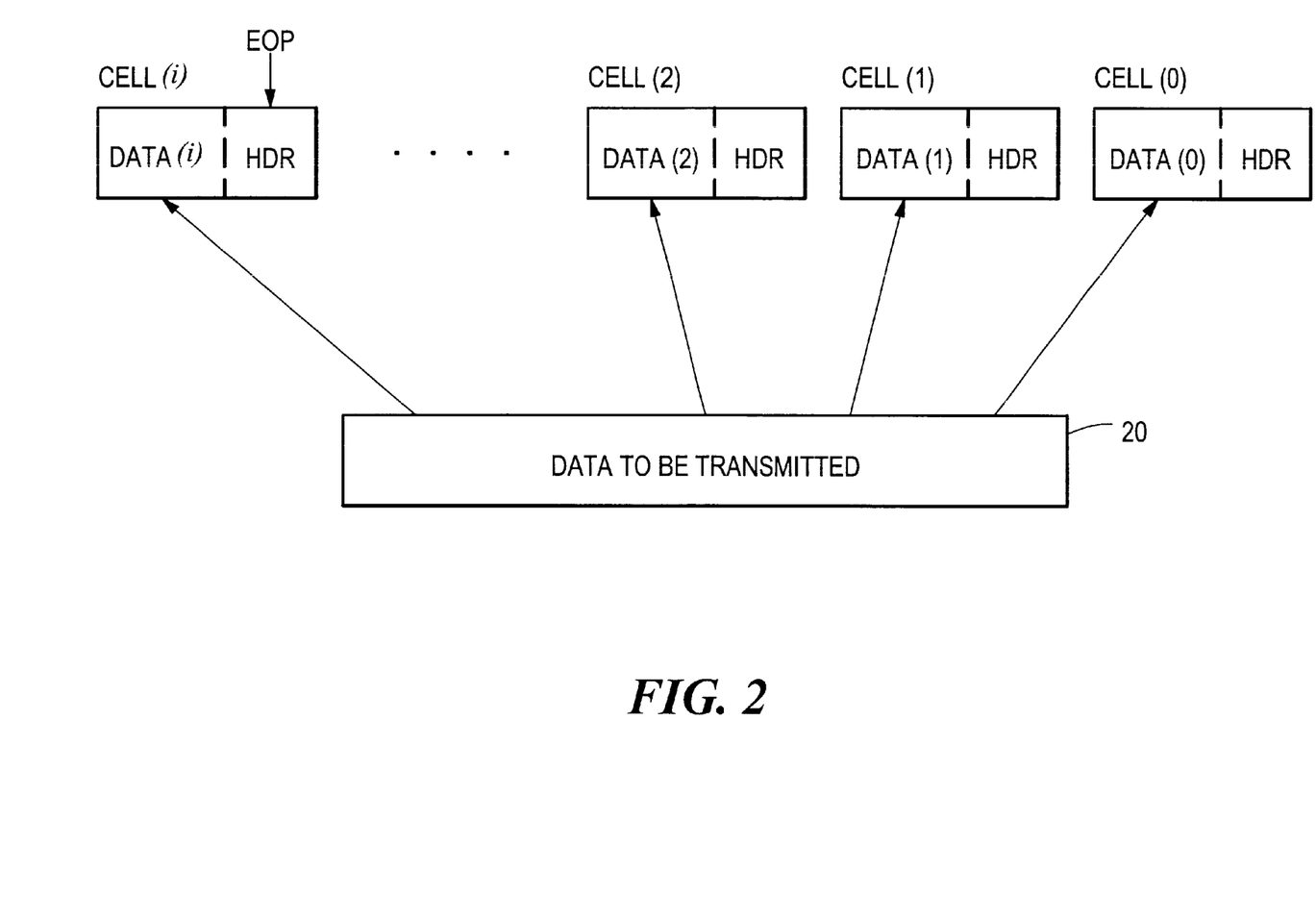
FIG. 2 schematically illustrates the structure of message packets and constituent message cells transferred over the network depicted in FIG. 1.

As further noted above, header portion HEADER(i) includes "virtual circuit" information which controls the transfer of the cell over the network 10. Each switching node 11(*n*) uses the virtual circuit information for a cell CELL(p) that it receives over an input communication link to identify an output communication link over which it is to transmit the cell to the next switching node or the destination computer system 12($m_D$). The virtual circuit information in the headers HEADER(i) of the cells CELL(i) associated with a packet 20 will be the same, but it will differ for cells associated with different packets. Although a destination computer system 12($m_D$) will be receiving cells generated for a specific packet 20 in the order of the data in the packet, it may be contemporaneously receiving cells from the network 10 which originated at several source computer systems 12($m_S$), which cells may be received in an interleaved manner. The virtual circuit information in each cell CELL(i)

will enable the destination computer system $12(m_D)$ to determine the packet 20 with which the cell is associated.

Figure 3:
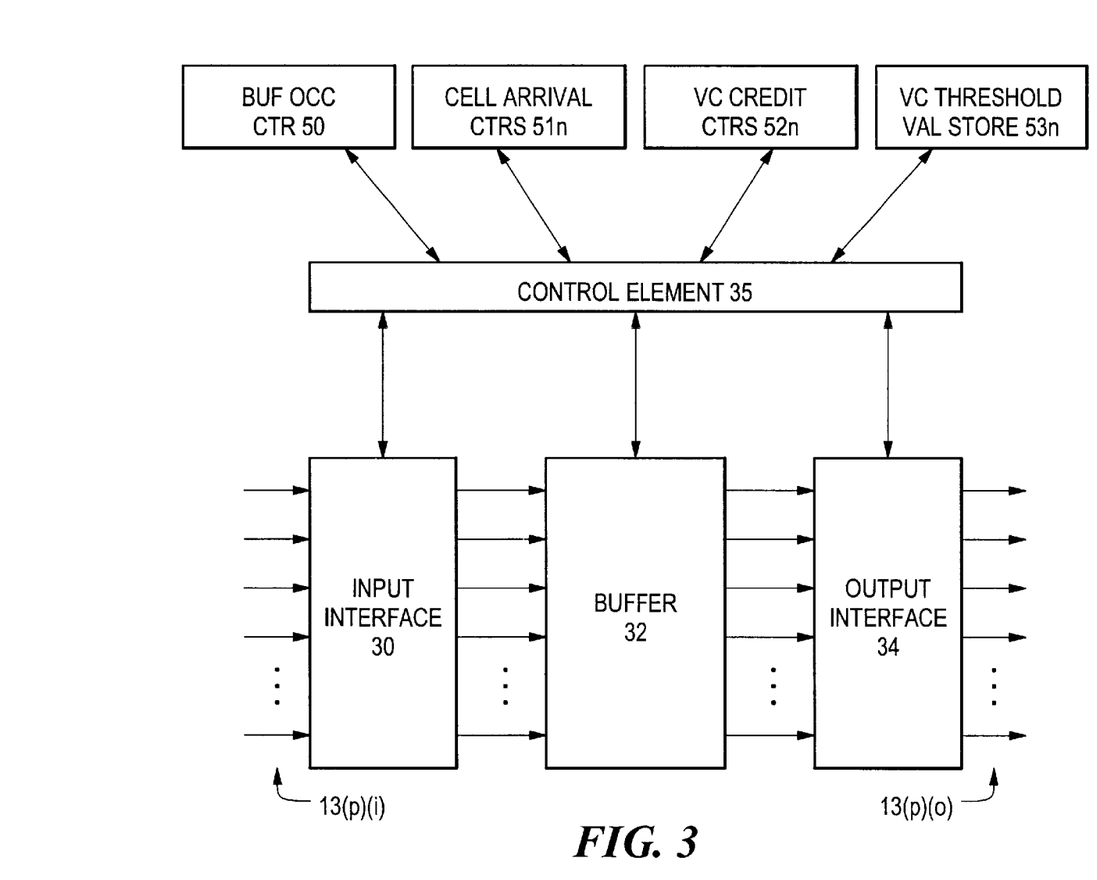
FIG. 3 schematically depicts a switching node, constructed in accordance with the invention, which is used in the computer network depicted in FIG. 1.

The switching nodes $11(n)$ comprising network 10 all have generally the same structure, which will be described in connection with FIG. 3. With reference to FIG. 3, each switching node $11(n)$ includes an input interface 30, a buffer 32, and an output interface 34, all under control of a control element 35. To facilitate bi-directional communications, the input interface 30 and output interface 34 will be connected to all of the communication links $13(p)$ to which the switching node $11(n)$ is connected to facilitate reception of signals from, and transmission of signals to, others of the switching nodes in the network 10 or ones of the computer systems $12(m)$ to which the switching node $11(n)$ is connected. In the case of the above-described embodiment in which the communication links $13(p)$ are in the form of optical fibers, the input interface 30 is connected to particular ones of the communication links, namely, input communication links $13(p)(i)$, over which the switching node $11(n)$ receives the optical signals, and the output interface 34 is connected to others of the communication links, namely, output communication links $13(p)(o)$, over which the switching node transmits the optical signals. It will be appreciated that each input communication link $13(p)(i)$ will constitute an output communication link over which a computer system $12(m)$ or another switching node in the network 11 transmits signals, and each output communication link $13(p)(o)$ will constitute an input communication link over which a computer system $12(m)$ or another switching node in the network 11 receives signals.

The input interface 30, under control of the control element 35, receives signals defining a cell CELL(n) from the input communication links and supplies to buffer 32 for buffering. The buffer 32 may comprise a unitary buffer which receives and buffers cells CELL(i) in electrical form generated by the input interface 30 in response to the optical cells it receives from all of the input communication links $13(p)(i)$. Alternatively, the buffer 32 may comprise a plurality of buffer sections each of which is allocated to the separate output communication links $13(p)(o)$, each of which will receive and buffer cells CELL(i) to be transmitted over from one or a selected sub-set of the output communication links $13(p)(o)$. (As will be described below in connection with FIG. 4, it will be assumed herein that the buffer 32 comprises a plurality of buffer sections, each of which is associated with one of the separate output communication links $13(p)(o)$.) The output interface 34 will generally transmit cells CELL(i) to be transmitted over each output communication link $13(p)(o)$ in the order a in which they are received and loaded into the buffer 32. The output interface 34 receives the cells CELL(i) which are buffered in the buffer 32, converts the cells, which at this point are still in electrical signal form, to optical form and couples the optical signals over the output communication links $13(p)(o)$. For each cell CELL(i) transmitted by the output interface 34, the control element 35 may update the header portion HEADER(i) with a new virtual circuit identifier as it is being transmitted.

As noted above, the control element 35 enables cells CELL(i) received from the input communication links $13(p)(i)$ to be buffered in the buffer 32. If the input buffer fills faster than the cells CELL(i) can be drained from the buffer 32 and transmitted over the output communication links $13(p)(o)$, the buffer 32 may overflow, in which case the subsequently-received cells would not be buffered, but instead would be lost. The ATM transfer methodology defines a number of types of service classes, and, for several of those service classes, service rate guarantees may be provided. For connections which have a particular service rate guarantee, the network will guarantee that cells associated with those connections will be transferred at least at a particular minimum rate through the network. Similarly, the ATM transfer methodology provides for certain quality of service levels which provide for maximum cell delivery delays and cell loss ratios to be provided to virtual circuits during the entire period of time during which the respective virtual circuits are established. These service rates and qualities of service may differ as among the various network users. Users may be provided with a minimum service rate, in which case they expect to be provided with at least a specified minimum rate, but may be transferred at a faster rate when there is available transfer bandwidth above the bandwidth that required for the connections for which there is a service rate guarantee. In addition, users may be provided with particular qualities of service, in which case they expect that cells will be transferred with a maximum delay and cell loss ratio as agreed to by switching nodes along the path for the respective virtual circuit.

Figure 4:
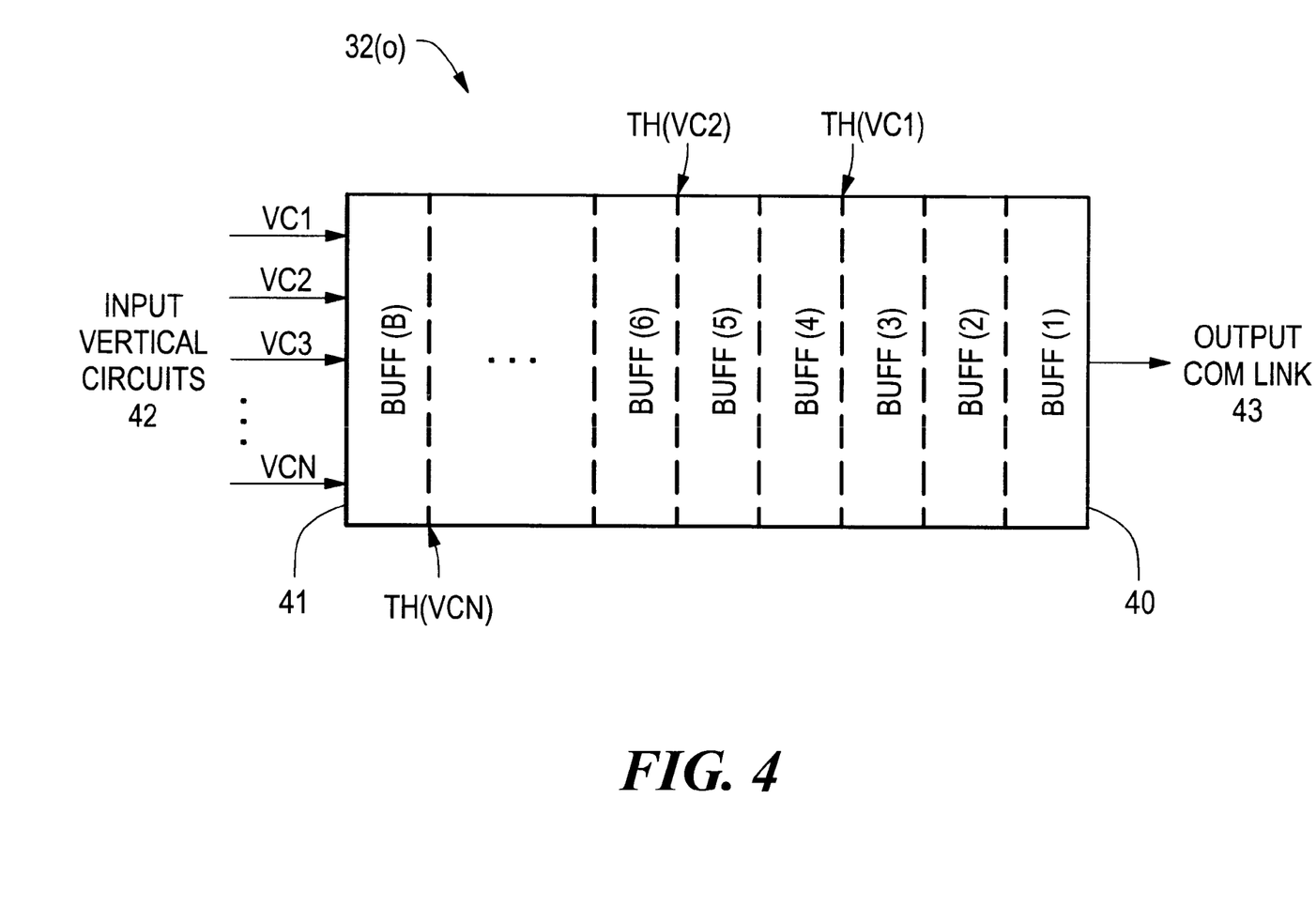
FIG. 4 is a diagram useful in understanding the operation of the switching node depicted in FIG. 3.
Figure 5A:
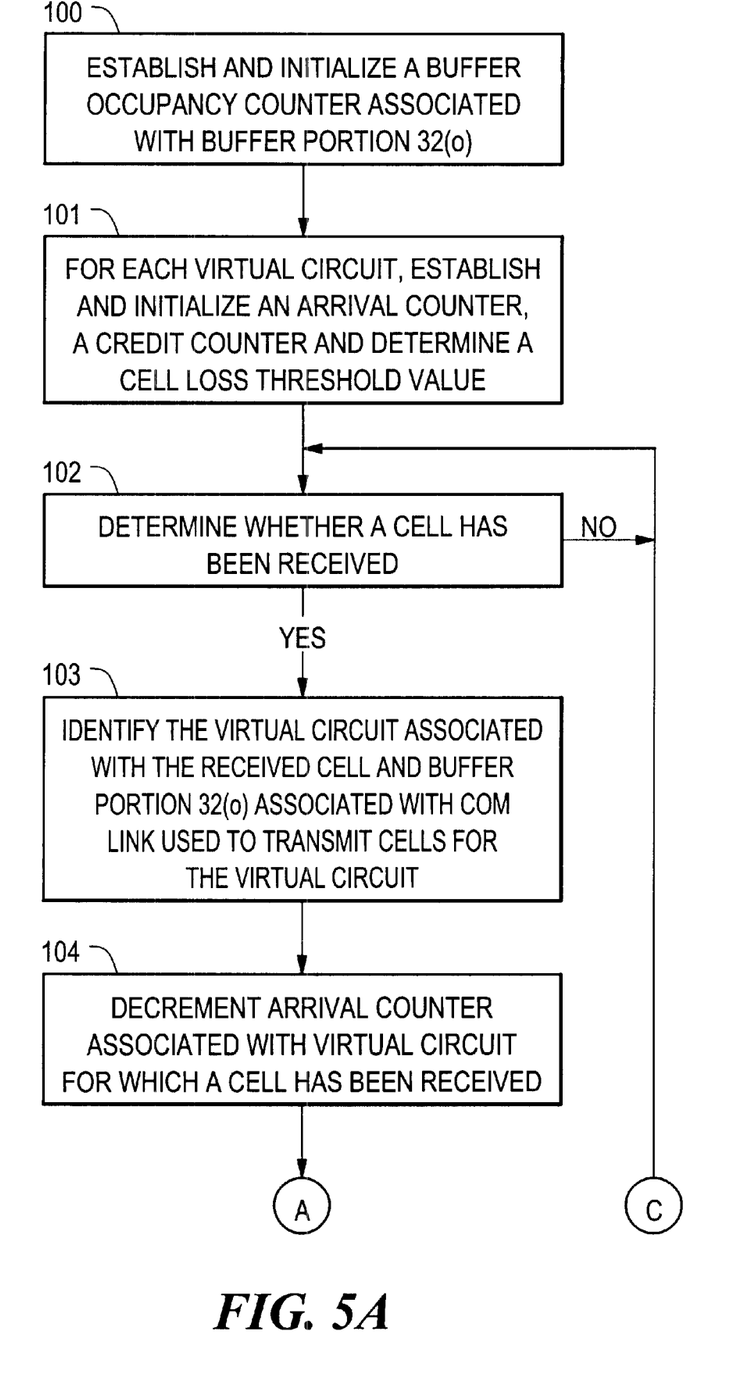
FIG. 5 comprises a flow-chart illustrating the operations of the switching node in accordance with the invention.
Figure 5B:
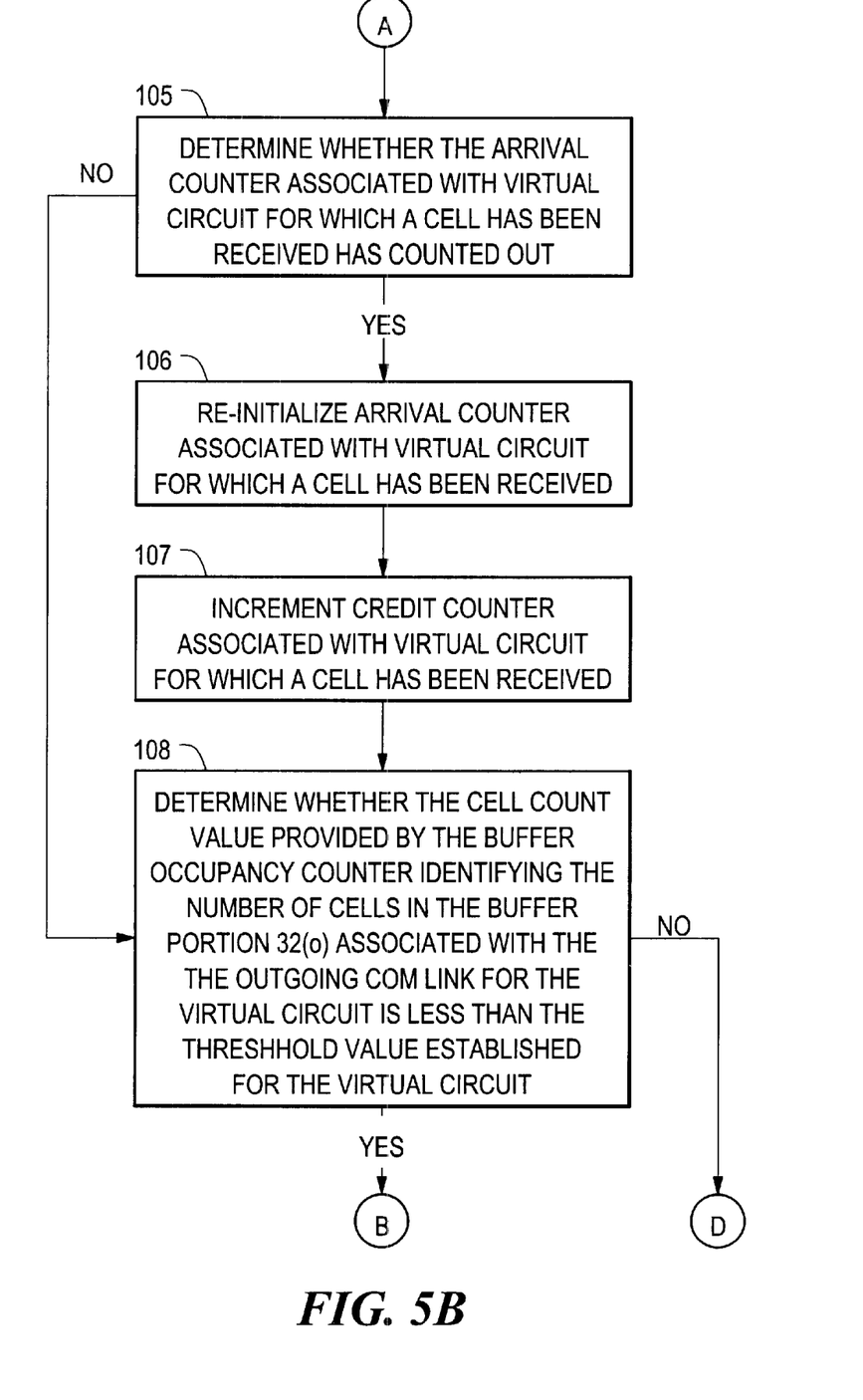
Figure 5C:
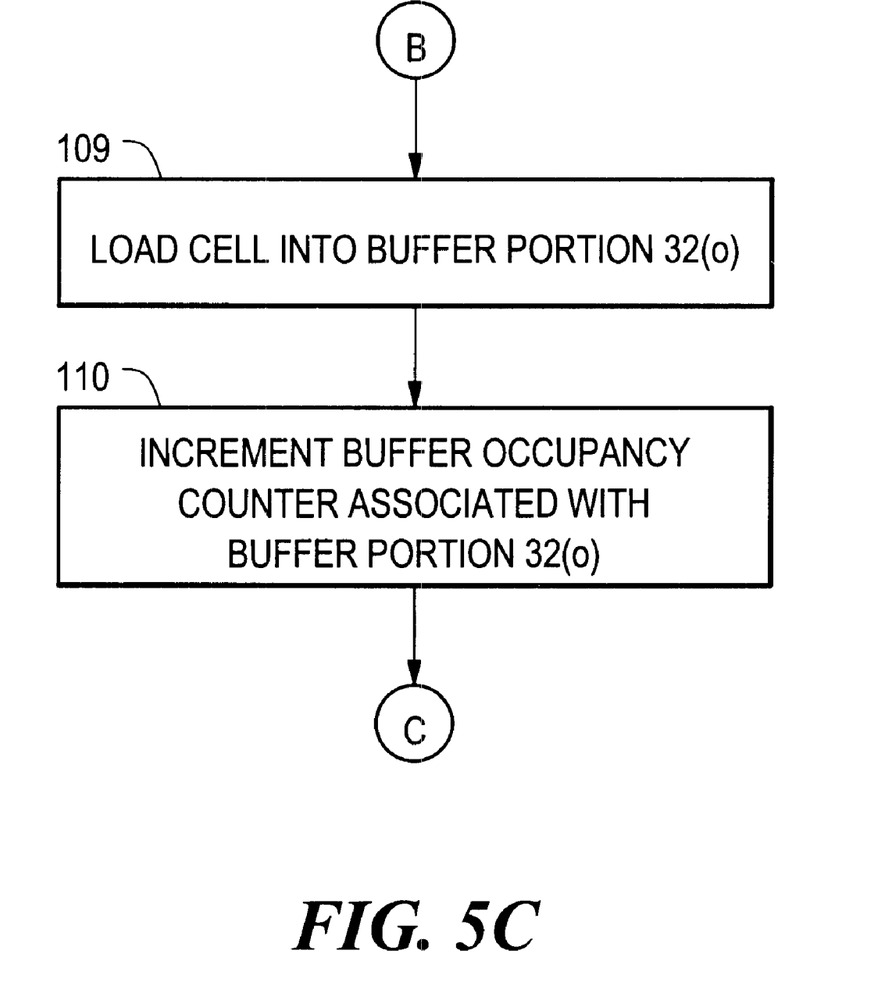
Figure 5D:
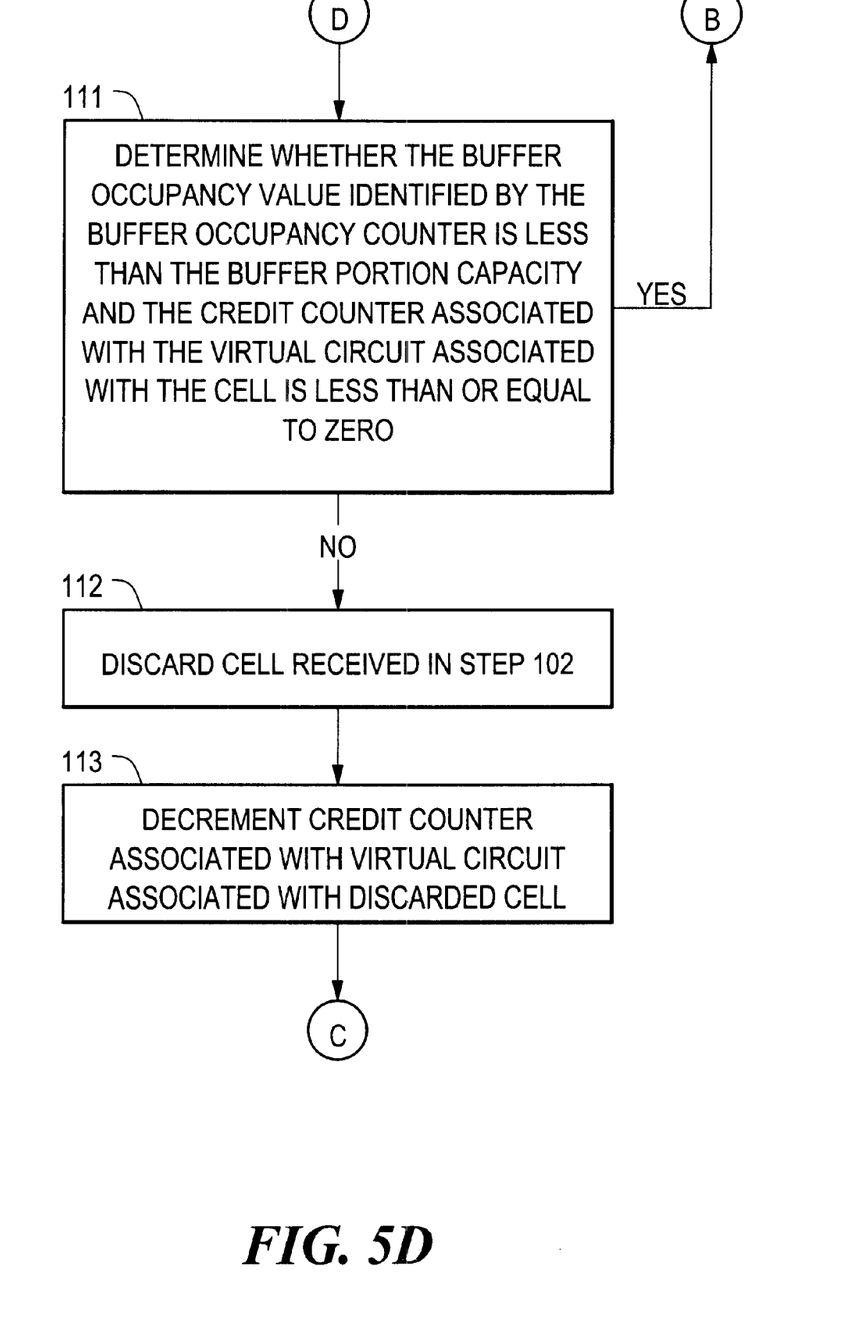

The invention provides an arrangement by which the control element identifies virtual circuits for which cells can be discarded, to ensure that the minimum service rate guarantees for all of the virtual circuits can be observed. with reference initially to FIG. 4 that schematically depicts a representation of the portion of buffer 32, identified by reference numeral $32(o)$, that is associated with one of the output communication links $13(p)(o)$, identified in FIG. 4 by reference numeral 43. As is conventional, the buffer 32 comprises a plurality of storage locations BUFF(1) through BUFF(B) ((generally identified by reference numeral BUFF (b)) extending from an output storage location "BUFF(1)" at an output end depicted at the right end of the buffer portion $32(o)$ as shown in FIG. 4, to an input storage location "BUFF(B)" at an input end 41 depicted at the left end of the buffer portion $32(o)$. cells for the virtual circuits VC1 through VCN (generally referred to as VCn) which are to be transmitted over the communication link 43 associated with the output communication link 43 are provided to the buffer portion $32(o)$ by the input interface 30 at the input end 41 and are drained from the buffer portion $32(o)$ from the output end 40 and transferred to the output interface 34 for transmission over the output communication link 43. In the representation depicted in FIG. 4, buffer portion $32(o)$ is a FIFO buffer, so that, as a cell is loaded into the buffer portion $32(o)$ through the input end 41, it is packed on top of previously-loaded undrained cells, and as each cell is drained from the buffer, the undrained cells in the buffer will shift toward the output end 40, so that undrained cells will be packed toward the output end 40.

It will be appreciated that the buffer portion $32(o)$ can store at most "B" undrained cells at any point in time. Accordingly, if the switching node $11(n)$ is receiving cells for the virtual circuits VCn associated with the buffer portion $32(o)$ more rapidly than it can transmit them over the output communication link 43, the occupancy level of the buffer portion $32(o)$, that is, the number of cells that are being buffered, will increase. If the number of cells buffered by buffer portion $32(o)$ reaches "B," the number of storage locations provided by buffer portion $32(o)$, the buffer portion is in an overflow condition, at which point the buffer portion $32(o)$ will be unable to buffer additional cells received for the output communication link 43 until its occupancy level is reduced. If the buffer portion $32(o)$ is in an overflow condition, it may not be able to satisfy the service guarantees that it has provided for the various virtual circuits.

In accordance with the invention, to reduce the likelihood that the cell occupancy level of the buffer portion 32(o) will increase to a level at which it will be in an overflow condition, the control element 35 of the switching node 11(n) implements a cell loss balancing mechanism whereby, if certain preselected criteria are satisfied, the control element 35 can enable a cell associated with a particular virtual circuit VCn to be discarded. The cell loss balancing criteria are determined for each virtal circuit VCn in relation to the quality of service and cell loss guarantee that is provided by the switching node 11(n) for the particular virtual circuit VCn, and accordingly, each virtual circuit VCn may have associated therewith cell loss balancing criteria which differ from the criteria that are associated with other virtual circuits.

The detailed operations performed by the control element 35 in connection with the cell loss balancing mechanism will be described in detail below in connection with FIG. 5. Generally, in accordance with the cell loss balancing mechanism, for each virtual circuit VCn, the control element 35 accumulates "credits" for cells CELL(i) associated with the virtual circuit VCn that are received and buffered for transmission in the buffer portion 32(o). The rate at which the control element 35 accumulates credits for the respective virtual circuit VCn, relative to the receipt of cells CELL(i) associated with the virtual circuit VCn, is determined by the quality of service and cell loss guarantee that the switching node 11(n) is providing to the virtual circuit VCn. Thus, if the switching node 11(n) has provided a relatively low cell loss rate guarantee to a particular virtual circuit VCn (so that the ratio of the number of cells CELL(i) associated with a particular virtual circuit VCn that are transmitted by the switching node 11(n), to the total number of cells CELL(i) associated with the same virtual circuit VCn that are received by the switching node 11(n) will be relatively high), the control element 35 will accumulate credits for the virtual circuit VCn at a relatively low rate. On the CASC-005 other hand, if the switching node 11(n) has provided a higher cell loss rate guarantee to a particular virtual circuit (so that the ratio of the number of cells CELL(i) associated with a particular virtual circuit VCn that are transmitted by the switching node 11(n), to the total number of cells CELL(i) associated with the same virtual circuit VCn that are received by the switching node 11(n) will be somewhat lower), the control element will accumulate credits for the virtual circuit VCn at a correspondingly higher rate.

When the cell occupancy of the buffer exceeds a predetermined threshold level associated with the particular virtual circuit VCn, represented in FIG. 4 by identifiers "TH (VC1)," "TH(VC2),", and "TH(VCN)" (generally "TH (VCn)"), if the control element has accumulated a positive number of credits for the virtual circuit VCn, the control element 35 can discard a cell received by the switching node 11(n) associated with the virtual circuit VCn, and reduce the number of credits that are associated with the VCn. The threshold levels may be determined heuristically, and may differ for the various virtual circuits that are being serviced by the switching node 11(n). For example, in one embodiment, the threshold level associated with a virtual circuit VCn is generally set somewhat higher if the rate at which control element 35 accumulates credits for the virtual circuit VCn is relatively low, and somewhat lower if the rate at which the control element 35 accumulates credits for the virtual circuit VCn is somewhat higher. In one embodiment, the threshold values TH(VCn) are selected to b be fixed values, but as described below they may vary.

The control element 35 makes use of several data structures in connection with the cell loss balancing mechanism, which are shown in FIG. 3, including a buffer occupancy counter 50, a plurality of cell arrival counters 51n each associated with one of the virtual circuits VCn through the switching node 11(n), a plurality of virtual circuit credit counters 52n each associated with one of the virtual circuits VCn through the switching node 11(n), and a plurality of threshold value stores 53n each associated with one of the virtual circuits VCn through he switching node 11(n). The control element 35 uses the buffer occupancy control 50 to identify the number of cells CELL(i) that are buffered in the buffer portion 32(o) at any point in time. Thus, when a cell CELL(i) is loaded into the buffer portion 32(o), the control element 35 will increment the buffer occupancy counter 50, and when a cell CELL(i) is removed from the buffer portion 32(o) for transmission over the output communication link 43, the control element 35 will decrement the buffer occupancy counter 50.

The cell arrival counter 51n associated with respective virtual circuit VCn is used to control the rate at which credits are accumulated for the particular virtual circuit VCn, in relation to receipt of cells CELL(i) associated with the virtual circuit VCn. In particular, for each virtual circuit VCn, the control element 35 will initially load the cell arrival counter 51n associated with the virtual circuit VCn with a value that corresponds to the reciprocal of the cell loss ratio established for the respective virtual circuit. Since the cell loss ratio corresponds to (i) the number of cells CELL(i) that the switching node 11(n) is permitted to lose, discard or otherwise fail to forward, in relation to (ii) a predetermined number of cells received by the switching node 11(n), the value loaded into the cell arrival counter corresponds to the number of cells CELL(i) that the switching node 11(n) receives in relation to the number of cells CELL (i) that the switching node 11(n) is permitted to lose, discard or otherwise fail to forward. Thus, if the switching node 11(n) has committed to a cell loss ratio of, for example, 1/L, the control element 35 will load a value of L, which will be termed the "cell forwarding ratio" in the cell arrival counter 51n. Thereafter, for each cell CELL(i) that the switching node 11(n) receives associated with the virtual circuit VCn, the control element will decrement the cell arrival counter 51n.

The control element 35 uses the credit counter 52n associated with each virtual circuit VCn to indicate a credit value for the virtual circuit VCn. When the cell arrival counter 51n associated with the virtual circuit VCn has counted out (that is, decremented to zero), the control element 35 will increment the credit control 52n associated with the virtual circuit VCn. In addition, the control element 35 will re-load the cell arrival counter 52n and repeat the operations described above. The credit value provided by the credit counter 52n indicates the number of "sets" of "L" cells CELL(i) that are associated with the virtual circuit VCn for which the switching node 11(n) has not lost, discarded or otherwise failed to forward at least one cell CELL(i). Thus, if the cell occupancy of the buffer portion 32(o) is high enough that the control element 35 is to start discarding cells for a virtual circuit VCn, and if the credit counter 52n associated with the virtual circuit VCn has a positive value, indicating that the switching node 11(n) has properly transmitted at least one set of "L" cells without losing, discarding or otherwise failing to forward at least one cell CELL(i), the control element 35 can discard a number of cells corresponding to the credit value provided by the credit counter and meet its cell loss commitment for the virtual circuit VCn. For each cell CELL(i) so discarded, the control element 35 will decrement the credit counter 52n, so that the credit counter 52 will provide a running indication of the number of cells CELL(i) that the switching node 11(n) can lose, discard, or otherwise fail to forward for the virtual circuit VCn and still meet its cell loss commitment for the virtual circuit VCn.

The control element 35 uses the respective threshold value store 53n to store a threshold value for the virtual circuit VCn. The threshold value identifies the cell occupancy level for buffer portion 32(o) at which the control element can begin discarding cells CELL(i) for the virtual circuit VCn. Thus, if the buffer occupancy as indicated by buffer occupancy counter 50 is less than or equal to the threshold value as indicated by threshold value store 53n, the switching node 11(n) will not begin discarding cells CELL (i) associated with the virtual circuit VCn, but instead will continue loading cells CELL(i) received for the virtual circuit VCn in the buffer portion 32(o). On the other hand, if the buffer occupancy as indicated by the buffer occupancy counter 50 exceeds the threshold value, if the credit counter 52 indicates that the switching node 11(n) can lose, discard, or otherwise fail to forward for the virtual circuit VCn, the switching node 11(n) can discard cells CELL(i) associated with the virtal circuit VCn as described above, without loading them in the buffer portion 32(o). Thus, the switching node 11(n) will not forward the discarded cells CELL(i) along the virtual circuit. It will be appreciated that, if the credit counter 52 indicates that the switching node 11(n) can not lose, discard, or otherwise fail to forward for the virtual circuit VCn and still meet its cell loss commitment for the virtual circuit VCn, the switching node 11(n) will not discard cells CELL(i) associated with the virtual circuit VCn even if the buffer occupancy value exceeds the threshold value associated with the virtual circuit as indicated by the threshold value store 53n.

The particular threshold value selected for each virtual circuit VCn may be determined heuristically, and may differ from threshold values selected for other virtual circuits serviced by the switching node 11(n). Generally, the threshold value selected for a virtual circuit VCn will be somewhat higher if the rate at which control element 35 accumulates credits for the virtual circuit VCn is relatively low, which will be the case if the value of the cell forwarding ration "L" associated with the virtual circuit VCn used as the initial value loaded in the cell arrival counter 51n, is relatively high. On the other hand, the threshold value will generally be somewhat lower if the rate at which the control element 35 accumulates credits for the virtual circuit VCn is somewhat higher, which will be the case if the value of the cell forwarding ratio "L" associated with the virtual circuit VCn used as the initial value loaded in the cell arrival counter 51n, is relatively low. In one embodiment, the threshold values TH(VCn) are selected to be fixed values, but as described below they may vary.

FIG. 5 depicts details of operations performed by the control element 35 in connection with the cell loss balancing mechanism. With reference to FIG. 5, the control element 35 initially establishes and initializes the buffer occupancy counter 50 associated with the buffer portion 32(o) (step 100). In addition, the control element 35 establishes and initializes the cell arrival counter 51n, and credit counter 52n for each virtual circuit VCn, and provides a threshold value for the virtual circuit VCn in the threshold value store 53n (step 101). It will be appreciated that, as virtual circuits are established through the switching node 11(n), the control element 35 will perform step 101 in connection with each such virtual circuit, to establish and initialize a cell arrival counter and credit counter 52n and provide a threshold value in a threshold value store 53n therefor. On the other hand, as virtual circuits are deleted, the control element 35 can delete the cell arrival counter, credit counter and threshold value store that are associated with the deleted virtual circuit.

Following step 101, the control element 35 will wait for a cell CELL(i) (step 102). When a cell CELL(i) is received, the control element 35 will identify the virtual circuit VCn that is associated with the received cell CELL(i) and the buffer portion 32(o) that is associated with the communication link 13(p) that will be used to transmit cells for the virtual circuit VCn (step 103). As is conventional, the control element 35 may be provided with a virtual circuit table (not shown) that identifies, for each virtual circuit serviced by the switching node 11(n), the particular one of the output communication links 43 over which cells CELL (i) associated with the virtual circuit are to be transmitted.

After the control element 35 identifies the virtal circuit VCn associated with the received cell CELL(i), it decrements the cell arrival counter 51n associated with that virtual circuit VCn (step 104), and determines whether the cell arrival counter 51n has "counted out," that is, decremented to zero (step 105). If the control element makes a positive determination in step 105, it sequences to step 106 to re-initialize the cell arrival counter 51n (step 106) and increment the credit counter 52n (step 107). Following step 107, or step 105 if the control element 35 makes a negative determination in that step, the control element 108 sequences to step 108 to determine whether the cell occupancy value of the buffer portion 32(o) associated with the communication link 13(p) that will be used to transmit cells for the virtual circuit VCn, as indicated by the cell occupancy counter 50, is less than the threshold value established for the virtual circuit VCn in the threshold value store 53n. If the control element 35 makes a positive determination in step 108, it loads the cell CELL(i) that had been received in step 102 into the buffer portion 32(o) (step 109) and increments the cell occupancy counter 50 that is associated with the buffer portion 32(o) (step 110). Thereafter, the control element 35 returns to step 102 to wait for the next cell CELL(i).

Returning to step 108, if the control element 35 makes a negative determination in that step, which will occur if the cell occupancy value of the buffer portion 32(o) associated with the communication link 13(p) that will be used to transmit cells for the virtual circuit VCn, as indicated by the cell occupancy counter 50, is greater than or equal to the threshold value established for the virtual circuit VCn in the threshold value store 53n, it (that is, the control element 35) will sequence to step 111. In that step, the control element 35 will determine whether (i) the cell occupancy value provided by the cell occupancy counter 50 associated with the buffer portion 32(o) is less than the capacity "B" of the buffer portion 32(o), and (ii) the credit value associated with the virtual circuit VCn, as provided by the credit counter 52n, is less than or equal to zero.

If the control element 35 makes a positive determination in step 111, which will occur if there is at least one empty storage location BUFF(b) (FIG. 4) in the buffer portion 32(o) and the virtual circuit VCn has no credits as indicated by the credit counter 52n, the control element 35 will sequence to step 109 to load the cell CELL(i) in the buffer portion 32(o) and increment the cell occupancy counter 50 associated with the buffer portion 32(o) (step 110) and return to step 102 and wait for the next cell.

On the other hand, if the control element 35 makes a negative determination in step 111, which will occur if either there are no empty storage locations BUFF(b) in the buffer portion 32(o) or the virtual circuit VCn has at least one credit as indicated by the credit counter 52n, it (that is, the control element 35) will discard the cell CELL(i) that had been received in step 102 (step 112), without loading it into the buffer portion 32(o), and decrement the credit counter 53n associated with the virtal circuit VCn associated with the cell CELL(i) (step 113). Thereafter, the control element 35 will return to step 102 and wait for the next cell.

The control element 35 will perform the operations described above in connection with each of the cells CELL (i) received by the switching node 11(n).

Although not described above in connection with FIG. 5, it will be appreciated that, when the control element 35 removes a cell CELL(i) from the buffer portion 32(o) for transmission over the output communication link 43, it (that is, the control element 35) will decrement the cell occupancy counter 50. Thus, the cell occupancy counter 50 will provide a value which indicates the number of cells CELL(i) buffered in the buffer portion 32(o).

The cell loss balancing mechanism provides a number of advantages. In particular, it provides a mechanism by which a switching node 11(n) can easily control the discarding of cells CELL(i) associated with the respective virtual circuits being handled by the switching node 11(n) if the occupancy portion of the buffer 32(o) used to buffer cells prior to transmission becomes relatively high, while still maintaining the cell loss guarantees provided by the switching node 11(n) to the respective virtual circuits. The cell loss balancing mechanism described herein can be readily implemented either in software or in hardware, or any combination of hardware and software.

It will be appreciated that a number of modifications may be made to the cell loss balancing mechanism as described above. For example, while the mechanism has been described as using fixed threshold values TH(VCn) for the respective virtual circuits VCn, it will be appreciated that the threshold values may vary. Illustratively, it may be desirable to maintain a nominal threshold value TH(VCn) for each virtual circuit VCn, which can be increased or reduced in relation to the rate at which the cell occupancy of the buffer portion 32(o) decreases or increases. In that case, the threshold value TH(VCn) may be increased if, for example, the cell occupancy of the buffer portion 32(o) is decreasing at a rate above a predetermined level. Contrariwise, the threshold value TH(VCn) may be decreased if, for example, the cell occupancy of the buffer portion 32(o) is increasing at a rate above a predetermined level. In addition, the amount by which the threshold value TH(VCn) is increased or decreased can depend on the rate at which the cell occupancy level is decreasing or increasing.

In addition, it will be appreciated that the control element 35, instead of decrementing the cell arrival counter 51n associated with a virtual circuit VCn when a cell CELL(i) for the virtual circuit VCn is received, can increment the cell arrival counter 51n. In that case, the cell arrival counter 51n can be initialized with a zero value and incremented when a cell CELL(i) is received for the virtual circuit VCn. After the incrementation, the control element 35 can compare the value provided by the cell arrival counter 51n to the value of the cell forwarding ratio "L" guaranteed for the virtual circuit, and increment the credit counter and re-initiale the cell arrival counter 51n when the value provided by the cell arrival counter 51n corresponds to the value of the cell forwarding ratio "L."

Furthermore, although the invention has been described in connection with balancing of cell loss as among individual virtual circuits, it will be appreciated that a system in accordance with the invention can instead balance cell loss among groups of virtual circuits. For example, a number of virtual circuits that require the same cell loss ratio guarantee can be associated with a group, and discarding of cells can be performed on any of the virtual circuits in the group when the buffer cell occupancy exceeds the threshold value for the group and the group's credit counter provides a positive value. One benefit of such an arrangement is that the number of credit counters and threshold value stores can be reduced, since only one credit counter and threshold value need be provided for each group, rather than for each virtual circuit in the group. On the other hand, it will be appreciated that such an arrangement will allow for maintenance of cell loss ratios as among groups of virtual circuits, instead of as among virtual circuits individually.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A switching node comprising:
   A. an input interface for receiving cells from at least one input communication link;
   B. a buffer for buffering selected ones of said cells prior to transmission over at least one output communication link, said buffer monitored by a cell occupancy counter providing a cell occupancy value; and
   C. a control element for selectively enabling cells received by said input interface to be buffered in said buffer, the control element discarding cells if the cell occupancy value exceeds a predetermined threshold level and a credit value indicates that the switching node has freedom to discard a cell without violating a cell loss ratio guarantee provided by the switching node.

2. The switching node as defined in claim 1 in which each cell is associated with a virtual circuit, the control element discarding cells if the cell occupancy value of the buffer exceeds a predetermined threshold level and a credit value associated with said virtual circuit indicates that the switching node has freedom to discard a cell without violating a cell loss ratio guarantee provided by the switching node for the virtual circuit.

3. The switching node as defined in claim 2 in which each cell is associated with one of a plurality of virtual circuits, the control element discarding cells if the cell occupancy value of the buffer exceeds a predetermined threshold level and a credit value associated with said one of a plurality of virtual circuits indicates that the switching node has freedom to discard a cell without violating a cell loss ratio guarantee provided by the switching node for the one of the plurality of virtual circuits.

4. The switching node as defined in claim 1 in which said predetermined threshold level is fixed.

5. The switching node as defined in claim 1 in which said predetermined threshold level is variable.

6. A network comprising a plurality of switching nodes interconnected by communication links, at least one switching node comprising:
   A. an input interface for receiving cells from at least one input communication link;
   B. a buffer for buffering selected ones of said cells prior to transmission over at least one output communication link, said buffer monitored by a cell occupancy counter providing a cell occupancy value; and
   C. a control element for selectively enabling cells received by said input interface to be buffered in said buffer, the control element discarding cells if the cell occupancy value exceeds a predetermined threshold level and a credit value indicates that the switching node has freedom to discard a cell without violating a cell loss ratio guarantee provided by the switching node.

7. The network as defined in claim 6 in which each cell is associated with a virtual circuit, the control element discarding cells if the cell occupancy value of the buffer exceeds a predetermined threshold level and a credit value associated with said virtual circuit indicates that the switching node has freedom to discard a cell without violating a cell loss ratio guarantee provided by the switching node for the virtual circuit.

8. The network as defined in claim 7 in which each cell is associated with one of a plurality of virtual circuits, the control element discarding cells if the cell occupancy value of the buffer exceeds a predetermined threshold level and a credit value associated with said one of a plurality of virtual circuits indicates that the switching node has freedom to discard a cell without violating a cell loss ratio guarantee provided by the switching node for the one of the plurality of virtual circuits.

9. The switching node as defined in claim 6 in which said predetermined threshold level is fixed.

10. The switching node as defined in claim 6 in which said predetermined threshold level is variable.

11. A method of operating a switching node comprising the steps of:
   A. receiving cells from at least one input communication link;
   B. buffering selected ones of said cells prior to transmission over at least one output communication link, said buffer monitored by a cell occupancy counter providing a cell occupancy value; and
   C. selectively enabling cells received by said input interface to be buffered in said buffer, selected ones of the cells being discarded if the cell occupancy value exceeds a predetermined threshold level and a credit value indicates that the switching node has freedom to discard a cell without violating a cell loss ratio guarantee provided by the switching node.

12. The method as defined in claim 11 in which each cell is associated with a virtual circuit, the cells being discarded if the cell occupancy value of the buffer exceeds a predetermined threshold level and a credit value associated with said virtual circuit indicates that the switching node has freedom to discard a cell without violating a cell loss ratio guarantee provided by the switching node for the virtual circuit.

13. The method defined in claim 12 in which each cell is associated with one of a plurality of virtual circuits, the cells being discarded if the cell occupancy value of the buffer exceeds a predetermined threshold level and a credit value associated with said one of a plurality of virtual circuits indicates that the switching node has freedom to discard a cell without violating a cell loss ratio guarantee provided by the switching node for the one of the plurality of virtual circuits.

14. The switching node as defined in claim 1 in which said threshold level is fixed.

15. The switching node as defined in claim 1 in which said threshold level is variable.

* * * * *